United States Patent
Shalem et al.

(10) Patent No.: US 6,622,019 B1
(45) Date of Patent: Sep. 16, 2003

(54) INCREASING CHANNEL CAPACITY IN FIXED CELLULAR NETWORKS

(75) Inventors: Ofer Shalem, Bat-Yam (IL); Lior Kushmaro, Holon (IL)

(73) Assignee: ECI Telecom, Ltd., Petach-Tikva (IL)

( * ) Notice: Subject to any disclaimer, the term of this patent is extended or adjusted under 35 U.S.C. 154(b) by 0 days.

(21) Appl. No.: 09/504,018

(22) Filed: Feb. 18, 2000

(30) Foreign Application Priority Data

Nov. 17, 1999 (IL) .................................................. 133005

(51) Int. Cl.$^7$ ................................................ H04Q 7/20
(52) U.S. Cl. ........................ 455/445; 455/561; 370/230; 370/474
(58) Field of Search ................................ 455/403, 445, 455/560, 561; 370/474, 477, 468, 229, 389, 230

(56) References Cited

U.S. PATENT DOCUMENTS

| | | | | |
|---|---|---|---|---|
| 5,018,136 A | * | 5/1991 | Gollub | 370/471 |
| 5,020,058 A | * | 5/1991 | Holden et al. | 341/87 |
| 5,299,198 A | * | 3/1994 | Kay et al. | 370/347 |
| 5,546,395 A | * | 8/1996 | Sharma et al. | 370/468 |
| 5,627,829 A | * | 5/1997 | Gleeson et al. | 370/230 |
| 5,699,356 A | * | 12/1997 | Beever et al. | 370/329 |
| 6,061,346 A | | 5/2000 | Nordman | |
| 6,115,394 A | * | 9/2000 | Balachandran et al. | 370/389 |
| 6,301,479 B1 | | 10/2001 | Roobol et al. | |
| 6,415,151 B1 | | 7/2002 | Kreppel | |
| 6,452,915 B1 | | 9/2002 | Jorgensen | |
| 6,480,717 B1 | | 11/2002 | Ramaswamy | |

* cited by examiner

Primary Examiner—Dwayne Bost
Assistant Examiner—Ronald J. Ward
(74) Attorney, Agent, or Firm—Fenster & Company (57) ABSTRACT

A method of forwarding signals over a cellular link. The method includes receiving, at a first base station of a cellular fixed network, a packet of signals having a data payload directed to a second base station, determining whether the data payload will be used by the second base station, and forwarding the entire packet if the data payload will be used and not forwarding the entire packet if the data payload will not be used.

27 Claims, 4 Drawing Sheets

INCREASING CHANNEL CAPACITY IN FIXED CELLULAR NETWORKS

FIELD OF THE INVENTION

The present invention relates to wireless communication networks and particularly to increasing the channel capacity of cellular networks.

BACKGROUND OF THE INVENTION

Cellular fixed networks are generally formed of a plurality of base transceiver stations (BTSs) which wirelessly contact mobile units (referred to also as mobile stations and/or cellular handsets), serviced by the network. The BTSs are connected, usually in a tree topology, to a regional base station controller (BSC) which controls the routing of calls in the network. In the tree topology, one or more of the BTSs are connected directly to the BSC, and the other BTSs connect to the BSC through other BTSs which serve as relay units. The links of the tree are formed of cables which comprise a predetermined number of channels according to the capacity of the link. Each channel includes bandwidth sufficient for passing the signals of a single telephone call at the rate of 16 Kbit/sec. A commonly used link is the E1 link which includes 120 channels. Alternatively, each channel includes bandwidth sufficient for passing the signals of a single telephone call at the rate of 8 Kbit/sec, and in such a case an E1 link includes 240 channels.

When a mobile unit participates in a telephone call, the BSC allocates, using circuit switching, a connection from the BSC to the BTS servicing the mobile. The allocated connection is formed of dedicated channels which are used only for signals passed to and from the mobile unit to which the connection was allocated, and the allocation remains in effect until the telephone call is terminated. During the call, the mobile unit converts input signals into digital signals. As the use of wireless bandwidth is very costly, the digital signals are compressed by the mobile unit, and the compressed signals are transmitted to the servicing BTS. Generally, every 20 msec the mobile unit generates a packet of 320 bits which represents the sounds collected by the mobile unit during a time period of 20 msec.

The servicing BTS passes the compressed signals as they are, without decompressing them, to the BSC, over the mobile's dedicated channels. The BSC usually decompresses the signals and transfers them to a Mobile switching Center (MSC) or to a public network to which the signals are directed.

Generally, each packet comprises a header and a payload. Exemplary headers are formed of 8 synchronization bits and 24 control bits or of 16 synchronization bits and 16 control bits. It is noted that other header structures exist, including encapsulations which distribute the control bits throughout the packets.

With the increase in usage of cellular phones the number of calls carried out concurrently by a single BTS and the number of concurrently allocated channels on a single link increased substantially. As the signals sent from the BTSs to the BSC are already compressed, further compression would degrade the signals below current quality standards.

Therefore, in order to supply the demand, additional cables and/or cables of larger bandwidth must be laid between the BSC and the BTSs. In some densely populated areas the laying of cables may be very costly.

SUMMARY OF THE INVENTION

An aspect of some preferred embodiments of the invention relates to identifying needless packets which are being passed over a connection the needless packets carry data which will not be used by the entity (e.g., BSC, BTS, mobile unit) to which the packets are directed. The data of these packets is not sent over the connection, thus reducing the load on the links hosting the connection. The needless packets are generated, for example, by a mobile unit or BTS in order to represent the sound signals at a time when the user of the mobile unit is not generating sounds (e.g., the user is listening to another party participating in the call).

Preferably, each link serves as one or more tunnels which pass packets from a plurality of mobile units assigned to the tunnel. Each tunnel is assigned a number of connections larger than the number of channels in the tunnel, based on the statistical average percentage of needless packets.

Packets passed through a tunnel are passed on one or more of the channels of the tunnel which channels are selected irrespective of the source, contents and destination of the packet. Thus, packets from a single source to a single destination which are passed through a tunnel may pass through different channels of the tunnel, and packets from different sources and to different destinations may pass on the same channel of the tunnel. In a preferred embodiment of the invention, each packet header is tagged with an identity tag which states to which connection the packet belongs, as the channel on which the packet is passed does not identify the channel. Alternatively or additionally, signaling bits not attached to the packets are used to state the connections to which the packets belong.

In a preferred embodiment of the invention, the needless packets are identified according to control bits in their header. Alternatively or additionally, the needless packets are identified based on control signals sent on a signaling line corresponding to the link on which the packets are passed. Further alternatively or additionally, the needless packets are identified based on their contents, e.g., packets which are all '1's.

An aspect of some preferred embodiments of the present invention relates to a base transmission station (BTS) which has an amount of bandwidth for receiving packets greater than the amount of bandwidth it has on links for forwarding packets. Preferably, the BTS and/or an external compression unit statistically compress the received packets onto the links it uses for forwarding packets.

There is therefore provided in accordance with a preferred embodiment of the invention, a method of forwarding signals over a cellular link, including receiving, at a first base station of a cellular fixed network, a packet of signals having a data payload directed to a second base station, determining whether the data payload will be used by the second base station, and forwarding the entire packet if the data payload will be used and not forwarding the entire packet if the data payload will not be used.

Preferably, receiving the packet includes receiving a stream of packets of the same size at equal intervals of time. Alternatively, receiving the packet includes receiving a packet which includes coded digital voice signals. Preferably, determining whether the data payload will be used by the second base station includes determining whether the contents of the payload will be decoded.

In a preferred embodiment of the invention, determining whether the data payload will be used by the second base station includes determining whether the second base station will forward the contents of the payload. Alternatively or additionally, determining whether the data payload will be used is dependent on information retrieved from a signaling line corresponding to the link. Alternatively or additionally, determining whether the data payload will be used is dependent on information retrieved from a header of the packet. Alternatively or additionally, determining whether the data payload will be used is performed before forwarding any part of the packet.

Alternatively, determining whether the data payload will be used is performed after forwarding at least part of the packet. Preferably, not forwarding the entire packet if the data payload will not be used includes forwarding less than the entire packet. Preferably, forwarding less than the entire packet includes forwarding only a header of the packet. Preferably, forwarding the entire packet includes forwarding through a tunnel used by a plurality of connections.

In a preferred embodiment of the invention, not forwarding the entire packet if the data payload will not be used includes not forwarding any of the packet. Preferably the method includes forwarding a message in place of a plurality of packets not forwarded.

In a preferred embodiment of the invention, forwarding the entire packet includes forwarding the packet along with a connection indication field. Alternatively or additionally, forwarding the entire packet includes forwarding through a tunnel used by a number of connections greater than the number of channels in the tunnel.

In a preferred embodiment of the invention, the first base station and the second base station include base transmission stations. In a preferred embodiment of the invention, the first base station includes a base station controller.

There is also provided in accordance with a preferred embodiment of the invention, a method of forwarding signals over a link between base stations, including receiving, at a first base station of a cellular fixed network, a plurality of packets, and forwarding the entire packet of at least one of the packets and not forwarding the entire packet of at least one of the packets. Preferably, receiving the plurality of packets includes receiving packets of a plurality of mobile units the packets of each mobile unit being received at a fixed rate. Alternatively or additionally, forwarding the entire packet of at least one of the packets includes forwarding the entire packet of less than a predetermined percentage of the received packets.

There is also provided in accordance with a preferred embodiment of the invention, a method for decompressing packets being forwarded over a link between base stations, including receiving signals belonging to a plurality of connections, forwarding packets which were received in their entirety, and generating replacement packets in place of packets not received in their entirety.

There is also provided in accordance with a preferred embodiment of the invention, apparatus for compressing packets being forwarded over a link between base stations, including an input interface which receives packets having a data payload, a processor which determines whether the data payload carries meaningful information, and an output interface which forwards the entire packet if the data payload carries meaningful information and does not forward the entire packet if the data payload does not carry meaningful information. Preferably, the processor which determines whether the data payload carries meaningful information also generates the packets. Alternatively or additionally, the processor examines a header of the packets to determine whether the data payload is meaningful.

In a preferred embodiment of the invention, the output interface begins to forward the packets before the processor determines whether the data payload is meaningful.

In a preferred embodiment of the invention, the apparatus includes a delay unit which delays forwarding the packets while the processor determines whether the data payload is meaningful.

There is also provided in accordance with a preferred embodiment of the invention, apparatus for decompressing packets being transmitted over a link between base stations, including an input interface which receives signals belonging to a plurality of connections, a forwarding unit which forwards packets which were received in their entirety, and a processor which generates replacement packets in place of packets not received in their entirety. Preferably, the processor generates replacement packets from received headers. Alternatively or additionally, the processor generates a plurality of replacement packets based on a single message. Preferably, the processor generates a plurality of replacement packets of different connections based on a single message.

There is also provided in accordance with a preferred embodiment of the invention, a system for forwarding packets from and to mobile units, including a base transmission station which generates a stream of packets each having a data payload, a compression unit which determines whether the data payload carries meaningful information, forwards the entire packet of packets which carry meaningful information and does not forward the entire packet of packets which do not carry meaningful information, and a base station controller which receives the forwarded packets and generates replacement packets for packets not forwarded in their entirety.

There is also provided in accordance with a preferred embodiment of the invention, apparatus for forwarding packets through a fixed cellular network, including a base transmission station having an interface to mobile units which receives packets of up to a total first amount of bandwidth, one or more first links, having a total second amount of bandwidth, through which the base transmission station receives packets, and one or more second links, having a total third amount of bandwidth which is smaller than the sum of the first and second amounts of bandwidth, through which the base transmission station forwards packets. Preferably, the third amount of bandwidth is smaller than the second amount of bandwidth. Alternatively or additionally, the base transmission station statistically compresses the packets received through the interface of the mobile units and through the one or more first links, into the second links.

In a preferred embodiment of the invention, a compression unit external to the base transmission station statistically compresses the packets received through the interface of the mobile units and through the one or more first links, into the second links.

There is also provided in accordance with a preferred embodiment of the invention, a telecommunication system operative in a cellular network, including one or more first base stations, each connected to a second base station via first transmission paths having first bandwidths, where said first bandwidths may be equal or different from each other, and a third base station connected to said second base station via a second transmission path having a second bandwidth which is substantially lower than the sum of said first bandwidths.

BRIEF DESCRIPTION OF THE DRAWINGS

The invention will be more clearly understood by reference to the following description of preferred embodiments thereof in conjunction with the figures, in which.

DETAILED DESCRIPTION OF PREFERRED EMBODIMENTS

Figure 1:
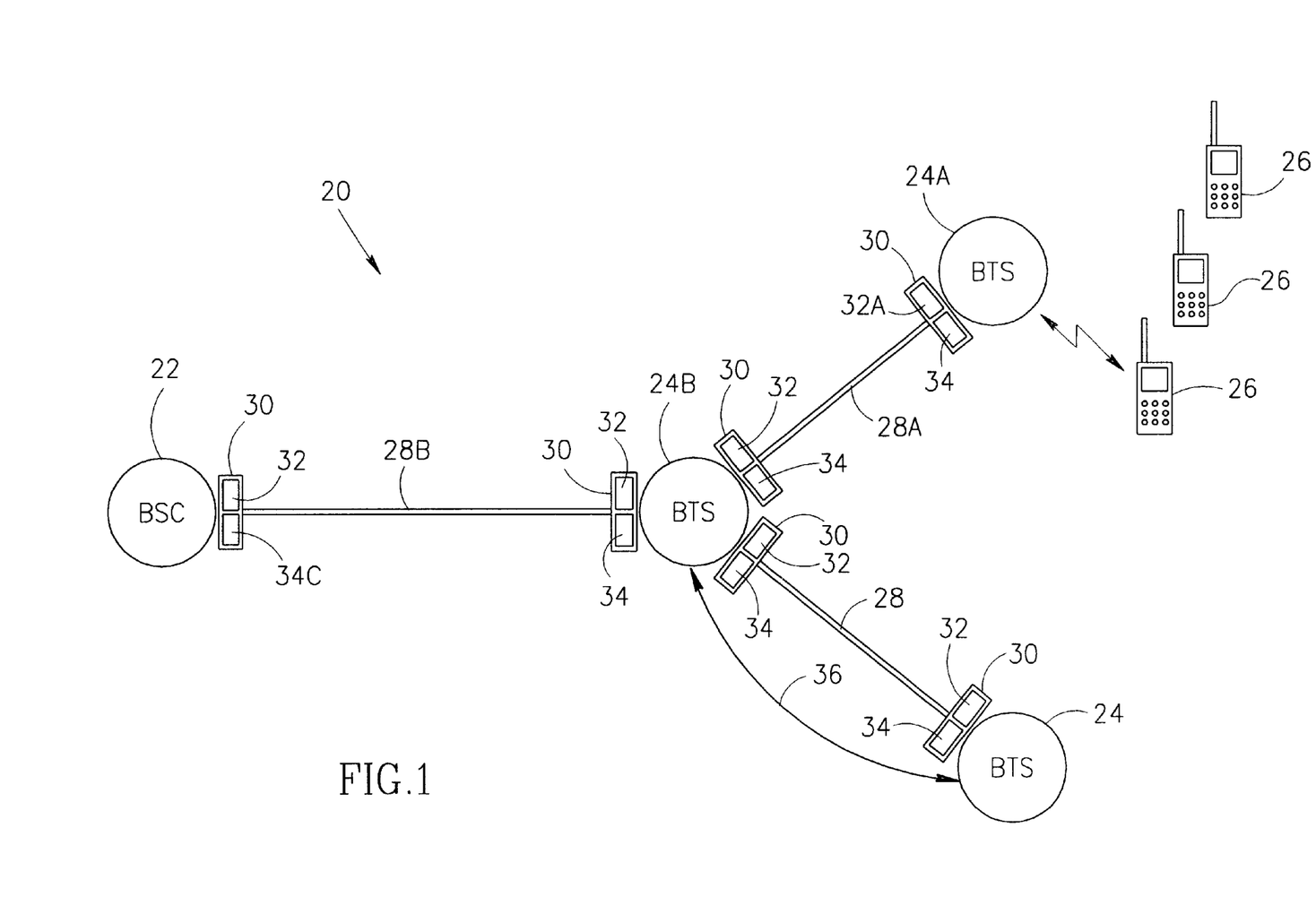
FIG. 1 is a schematic illustration of a portion of a cellular network, in accordance with a preferred embodiment of the present invention.

FIG. 1 is a schematic illustration of a portion of a cellular network 20, in accordance with a preferred embodiment of the invention. Network 20 comprises a plurality of base transceiver stations (BTSs) 24 which wirelessly contact mobile units 26 serviced by network 20. BTSs 24 are connected to a regional base station controller (BSC) 22, through a plurality of links 28 which comprise cable wires (e.g. the E1 link), or other communication links, such as wireless omnidirectional links. Each link comprises one or more tunnels which are formed of a plurality of channels. In the following description it is assumed that each link 28 accommodates a single tunnel including all the channels of the link. A plurality of statistical compression and decompression units 30 are located at the interfaces to the BTSs 24 and to BSC 22 in order to statistically compress and decompress the transmitted signals, as described hereinbelow. Each unit 30 preferably comprises a compression unit 32 for signals which it transmits and a decompression unit 34 for signals it receives.

Preferably, each tunnel is assigned a maximal number of virtual connections which the tunnel may service. The maximal number of virtual connections is preferably larger than the number of channels in the tunnel because of the statistical compression. When a mobile unit 26 initiates or receives a telephone call, BSC 22 allocates a virtual connection along a path of links 28 from the mobile unit to the BSC.

Figure 2:
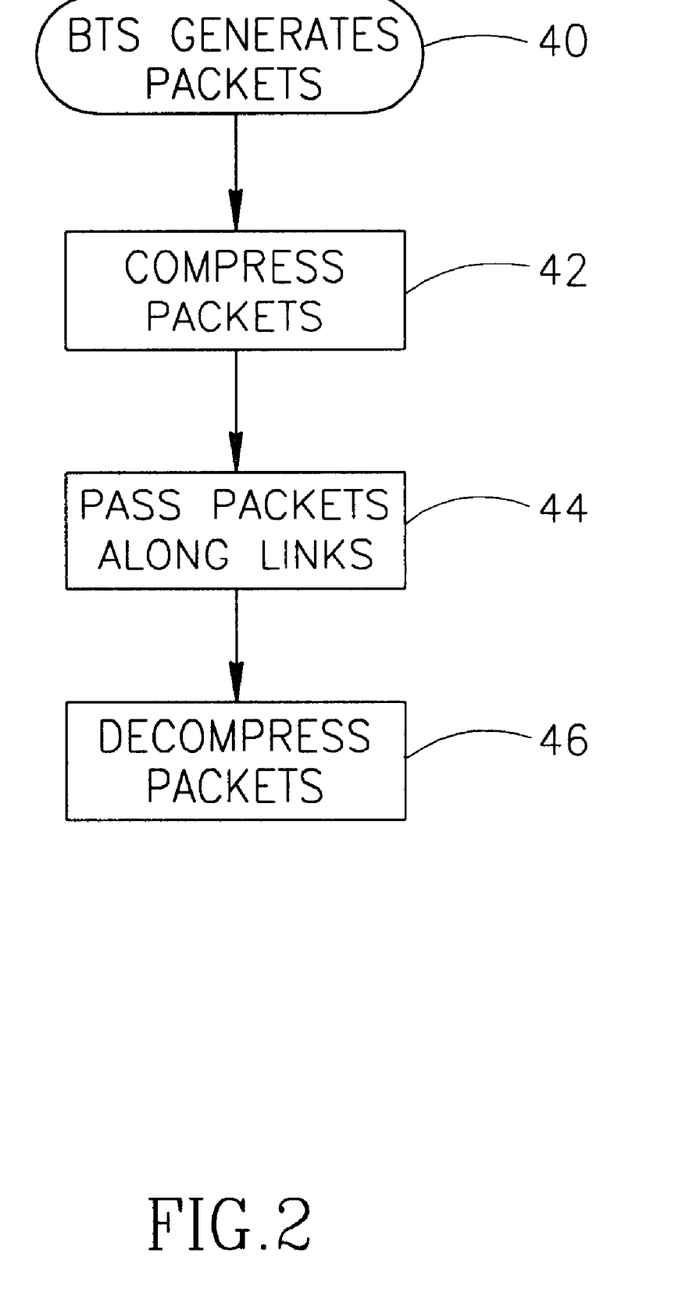
FIG. 2 is a flow chart of the actions performed on packets passing along a cellular fixed network, in accordance with a preferred embodiment of the present invention.

FIG. 2 is a flow chart of the actions performed on packets passing from a BTS 24A to BSC 22, in accordance with a preferred embodiment of the present invention. For each mobile unit 26 serviced by BTS 24A, BTS 24A preferably generates packets of 320 bits every 20 milliseconds (40). The packets pass through the compression unit 32A of BTS 24A which statistically compresses (42) the packets into a tunnel on link 28A. The packets are preferably passed (44) over link 28 to BTS 24B which transfers the packets intact to link 28B. The packets on link 28B are preferably decompressed (46) by decompression unit 34C and are provided to BSC 22.

Figure 3:
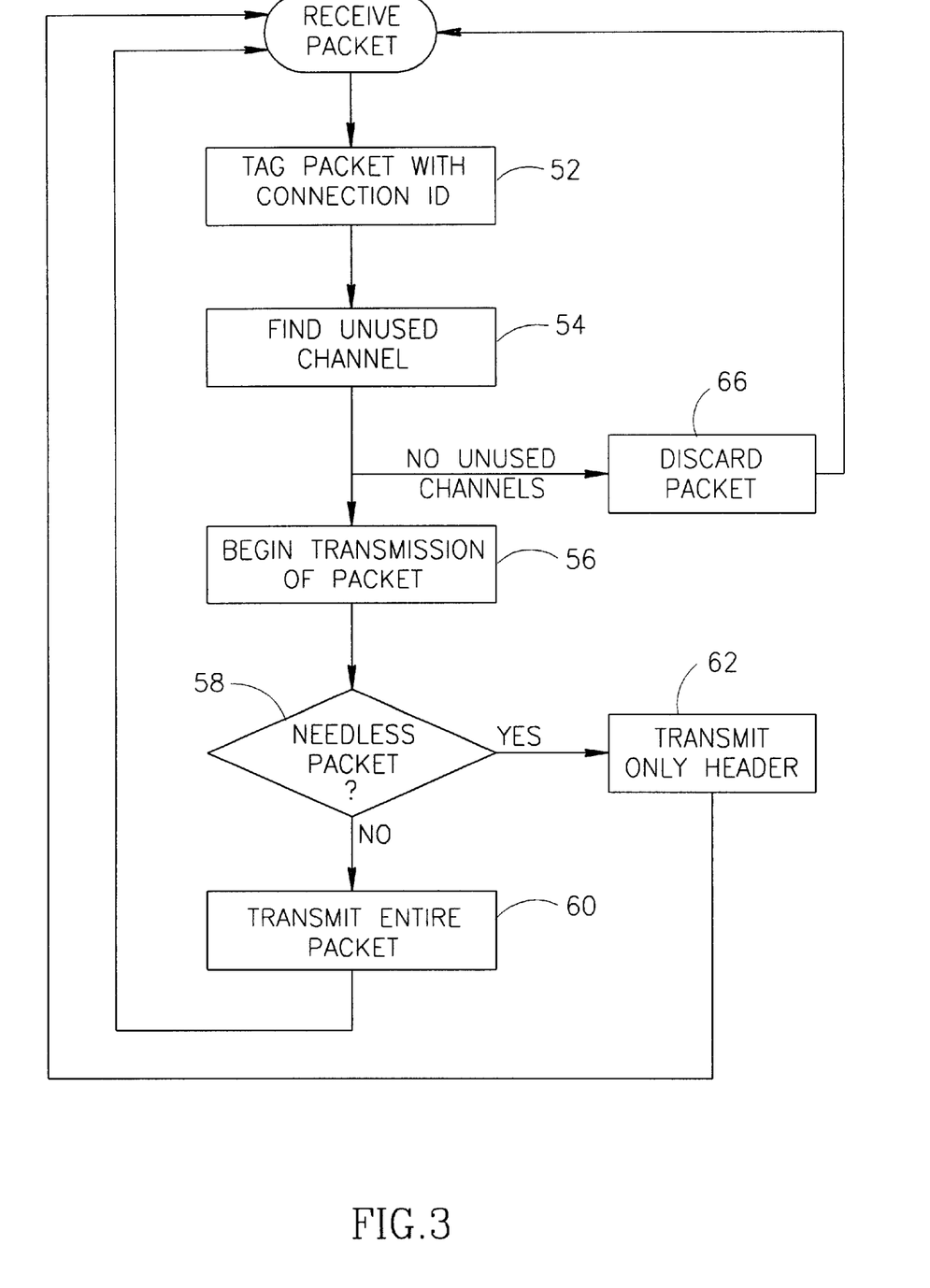
FIG. 3 is a schematic flow chart of the actions performed during statistical compression of packets in a cellular fixed network, in accordance with a preferred embodiment of the present invention.

FIG. 3 is a flow chart of the actions performed during statistical compression of packets, in accordance with a preferred embodiment of the present invention. Compression unit 32 receives each packet and preferably tags (52) a connection identification to the packet according to the virtual connection to which the packet belongs. Unit 32 preferably finds (54) an unused channel within the tunnel to which the virtual connection is assigned and begins to transmit (56) the header and/or the tag of the packet on that channel. If there are no available unused channels, the packet is preferably discarded (66). Unit 32 preferably determines (58) whether the packet is needless, i.e., whether the data carried by the packet will be read by BSC 22 (whether the data is meaningful). If the data will be read, the entire packet is preferably transmitted (60). However, if the data will be ignored, only the header and tag are transmitted (62).

Alternatively, only part of the header is transmitted, preferably that part of the header which is required in order to reconstruct the entire packet. In a preferred embodiment of the invention, all the synchronization bits in the header are transmitted together with some of the control bits of the header.

Preferably, determination 58 is concluded before the header (or the transmitted part of the header) is transmitted. Alternatively, the transmission of the header is delayed such that the determination is concluded before transmission of the header is finished. Further alternatively, if the determination is not concluded before the header is entirely transmitted, unit 32 begins transmitting the data of the packet. If after beginning to transmit the data, the packet is determined to be needless, the transmission is terminated and the channel is preferably immediately considered available for transmission of a different packet. Alternatively, when the determination requires more time than the transmission occurs relatively rarely, the entire packet is transmitted in such cases, although the packet is needless.

Referring in more detail to determining (58) whether the data carried by the packet will be read by BSC 22, in a preferred embodiment of the invention, unit 32 listens to a signaling line 36 (FIG. 1) corresponding to link 28. If signaling line 36 indicates that no voice data is being passed on a specific connection the packets of that connection are needless and therefore are discarded.

Alternatively or additionally, compression unit 32 consults the control bits of the header of the packet to determine whether the data of the packet should be discarded. Preferably, the data of the packet is discarded if a bad frame indicator, e.g., bit C12 in the header, indicates that the packet is defective. Alternatively or additionally, the data of the packet is discarded if the header indicates that the packet is idle, e.g., bits C1–C5 of the header are all ones. Further alternatively or additionally, the data of the packet is discarded if the header indicates discontinuation of transmission, e.g., bit C17 is set.

Further alternatively or additionally, compression unit 32 consults the payload of the packet to determine whether the data of the packet will be discarded. In a preferred embodiment of the invention, when the payload comprises one or more patterns used for padding needless packets, e.g., a packet formed of all '1's, the packet is discarded. It is noted that in this alternative, unit 32 preferably delays the received packets for the length of an entire packet in order to determine whether the packet is to be transmitted. Therefore, this alternative is preferably used only when such delay is acceptable.

Figure 4:
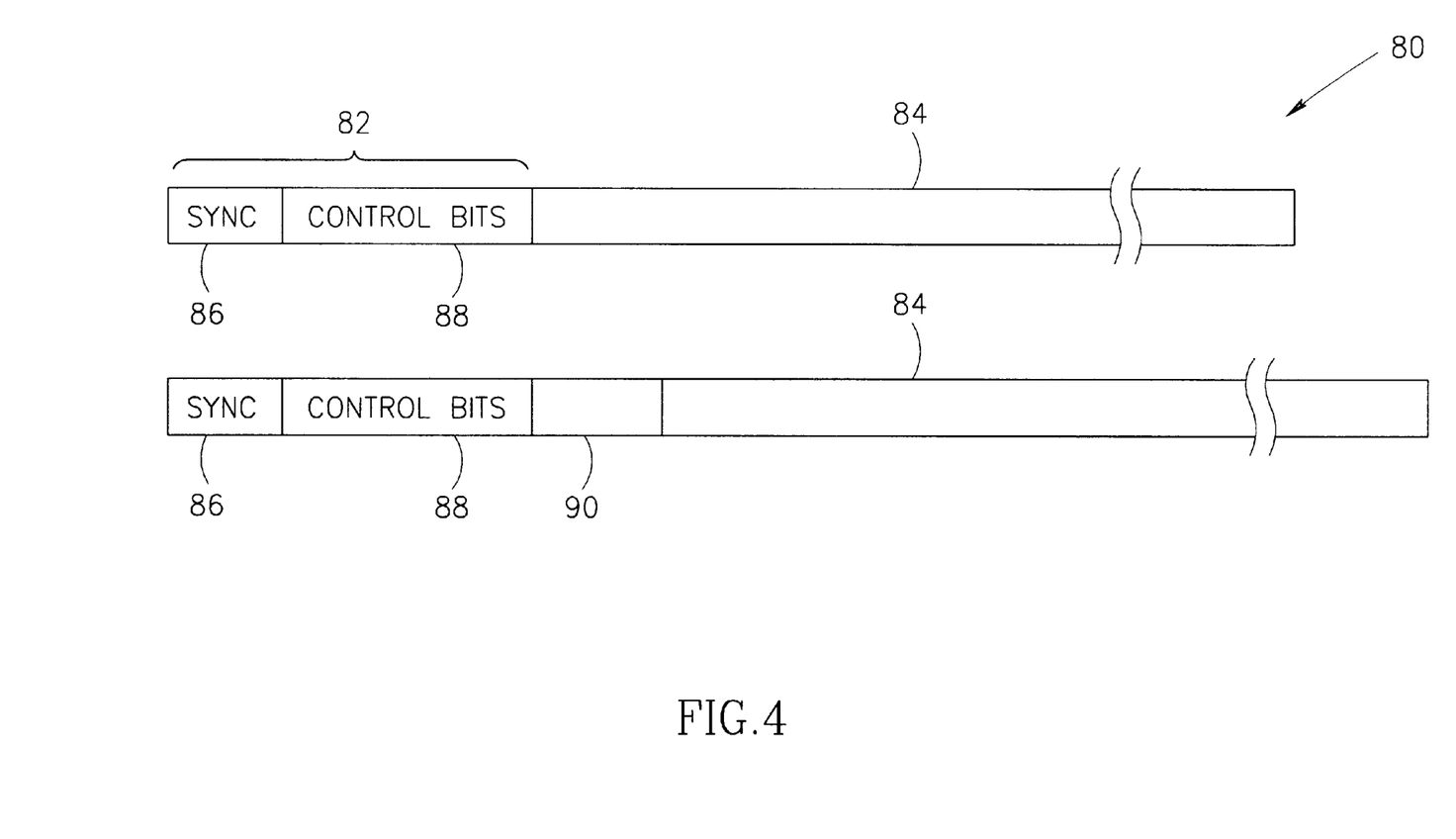
FIG. 4 is a schematic illustration of a voice packet, in accordance with a preferred embodiment of the present invention.

Reference is now made in more detail to tagging (52) the packet with the connection identification. FIG. 4 is a schematic illustration of a voice packet 80, in accordance with a preferred embodiment of the present invention. Packet 80 when it is created preferably comprises a header 82 having 32 bits and a data payload 84 having 288 bits. Header 82 preferably comprises 16 synchronization bits 86 and 16 control bits 88. In tagging a connection identification, unit 30 preferably adds a connection field 90 which contains the number of the virtual connection to which the packet belongs. Field 90 preferably includes the smallest number of bits required to uniquely identify the maximal number of connections accommodated by link 28. For E1 links which include 120 channels, field 90 preferably includes eight bits.

It is noted that the above mentioned sizes of header 82 and payload 84, as well as the numbers of synchronization bits 86 and control bits 88 are brought here by way of example and substantially any other sizes and bit numbers may be used with the present invention.

Field 90 is preferably located after the synchronization bits 86 anywhere in header 82. Alternatively, field 90 is located or distributed within payload 84 or at the end of packet 80. Alternatively or additionally, field 90 states the identity of the BTS 24 to which the packet is destined or the route of BTSs through which the packet is to pass. Further alternatively or additionally, signaling line 36 is used to state the connection to which each packet belongs.

Referring back to the decompression (48 in FIG. 2) performed by decompression unit 34C, when a packet is received, the connection indication bits of field 90 are removed. If the packet includes only a header, decompression unit 34C creates a fictitious payload, e.g., a payload formed entirely of '1's. It is noted that the header serves as an indication to reconstruct the packet.

In some preferred embodiments of the invention, unit 32 begins transmitting (56 in FIG. 3) the header of the packet before it is determined (58) whether the data of the packet is to be transmitted. Thus, the delay incurred by unit 32 is minimized.

Alternatively to sending the header to represent the packet which is not sent, a special message is sent representing one or more packets which are not sent. In this alternative, unit 32 preferably delays the received packets for a sufficient time required to determine whether the packets are to be transmitted. In a preferred embodiment of the invention, one or more special messages are sent to represent all the packets which are not sent over a predetermined period, e.g., 10 msec. Preferably, the special message states the connections to which the unsent packets belong, and any important information in their headers, such as the types of the packets (e.g., speech, data, idle, bad frame). Upon receiving the special message, decompression unit 34C reconstructs the packets according to the contents of the special message.

Further alternatively to sending the headers of unsent packets, compression unit 32 sends a special message notifying that packets will not be sent on a connection which is generating needless packets, for a predetermined period or until further notice. The special message preferably includes instructions on how to reconstruct the packets in decompression unit 34C.

Further alternatively or additionally, compression unit 32 does not send anything instead of messages which include payload which will not be read, and decompression unit 34C generates packets for active connections for which packets were not received.

In some preferred embodiments of the invention, before a packet is discarded (66) because all the channels are in use, compression unit 32 waits a predetermined time, e.g., a few msec, in case one of the channels becomes available. Alternatively or additionally, unit 32 keeps track of the timing of all the channels in the tunnel and determines whether one of the channels will become available within the predetermined time. In a preferred embodiment of the invention, unit 32 chooses the packet to be discarded based on priorities of the connections. Preferably, the connections are assigned priority levels, and the discarded packets are preferably packets from the lowest priority received within the predetermined period.

Alternatively or additionally, the connection from which packets are discarded, is a connection which its previous packets were needless packets.

Further alternatively or additionally, the connection from which packets are discarded is chosen according to the time for which the connection is active. In a preferred embodiment, the discarded packets are from the connection established last. In a preferred embodiment of the invention, a mobile unit 26 requesting to establish a connection when only a last few connections are available is notified that the connection is established conditionally. The user of the requesting mobile unit, may establish the call anyhow or may defer the call to a later time. In another preferred embodiment, the discarded packets belong to the earliest established connection.

In some preferred embodiments of the invention, instead of discarding (66) a packet, only the header of the packet is transmitted as described above with relation to needless packets.

In some preferred embodiments of the invention, the maximal number of connections on a single tunnel is chosen based on the number of channels in the tunnel and the average a percentage of needless packets. Preferably, the maximal number of connections includes a safety margin such that packets are discarded only rarely, as the discarding of packets causes interference in the connection and/or abrupt ending of the connection. In a preferred embodiment of the invention, the size of the safety margin depends on the number of channels in the tunnel. Preferably, the size of the safety margin depends on the inverse of the number of channels in the tunnel.

In a preferred embodiment of the invention, if BSC 22 determines that packets are being discarded it temporarily lowers the number of connections allowed in the tunnels in order to prevent further discarding of packets. Thus, after one of the connections is disconnected, under the initiative of the user or due to packet discarding, new connections are not allowed to take its place. Alternatively, connections which were disconnected due to discarding of packets are allowed to re-connect while new connections are not allowed to connect until a sufficient number of connections are terminated.

In some preferred embodiments of the invention, compression and decompression unit is an integral part of its respective BTS 24. Preferably, the combined BTS 24 does not create the payload of needless packets, and/or during decompression does not generate a fictitious payload. Alternatively or additionally, in order to keep BTSs 24 simple, units 30 are separate from BTSs 24 but a unit 30 is an integral part of BSC 22.

In a preferred embodiment of the invention, the signals are compressed by the unit 32 of the BTS 24 directly servicing the mobile unit 26 generating the signals, and are decompressed only at their entrance to BSC 22. On there passage through intermediate BTSs 24 and units 30 the signals preferably remain intact. Alternatively or additionally, for each link 28 which the signals pass the signals are compressed and decompressed.

In a preferred embodiment of the invention, each link comprises a single tunnel which includes all the channels of the link. Preferably, the single tunnel serves all the types of data to and from mobile units 26, including voice and data packets. Alternatively or additionally, one or more of links 28 comprise a plurality of tunnels. In a preferred embodiment of the invention, at least some of links 28 comprise a first tunnel for voice packets and a second tunnel for data packets. The tunnel for data packets is preferably managed as described in U.S. patent application Ser. No. 09/430,985, titled "Data Transmission on Wireless Network" and filed on Nov. 1, 1999, the disclosure of which is incorporated herein by reference.

In a preferred embodiment of the invention, one or more links 28 has one or more tunnels for packets from mobiles 26 directly connected to a BTS 24 incident on the link, and has different one or more tunnels for packets received by the BTS incident on the link from other BTSs. Alternatively or additionally, packets from mobile units 26 with high quality of service are passed through a first tunnel and other data packets are passed through a second tunnel.

The term tunnel refers, in the present application and claims, to a group of channels which are correlated such that a packet entering the tunnel may pass through any of the channels (one or more) included in the tunnel regardless of the source, contents and destination of the packet.

In the above description it was assumed that the tunneling of packets into the tunnel is performed by selecting a free channel and sending each packet on a single channel. It is noted, however, that this tunneling method is not necessary and substantially any other method of tunneling may be used in accordance with the present invention. It is further noted that the present invention can be implemented with substantially any type and size of links and with substantially any transmission rate on the links, including links allowing a plurality of different transmission rates. Numbers describing sizes of links and transmission rates thereon are brought only by way of example.

It is noted that the principles of the present invention apply both to transmission from the mobile unit to the BSC and to transmission from the BSC to the mobile unit. Although some of the above descriptions relate to transmission in only one direction, these descriptions pertain as well to transmission in the other direction.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of preferred embodiments thereof that are provided by way of example and are not intended to limit the scope of the invention. It should be understood that features described with respect to one embodiment may be used with other embodiments and that not all embodiments of the invention have all of the features shown in a particular figure. Variations of embodiments described will occur to persons of the art. Furthermore, the terms "comprise," "include," "have" and their conjugates, shall mean, when used in the claims, "including but not necessarily limited to." The scope of the invention is limited only by the following claims:

What is claimed is:

1. A method of forwarding signals over a cellular link, comprising:
   receiving, at a first base station of a cellular fixed network, a packet of signals having a data payload directed to a second base station;
   determining whether the data payload will be decoded by the second base station; and
   forwarding the data payload of the packet if the data payload will be decoded and not forwarding the entire data payload of the packet if the data payload will not be decoded.

2. A method according to claim 1, wherein receiving the packet comprises receiving a stream of packets of the same size at equal intervals of time.

3. A method according to claim 1, wherein receiving the packet comprises receiving a packet which includes coded digital voice signals.

4. A method according to claim 1, wherein whether the data payload will be decoded by the second base station comprises determining whether the second base station will forward or discard the contents of the payload.

5. A method according to claim 1, wherein determining whether the data payload will be decoded comprises determining based on information retrieved from a header of the packet.

6. A method according to claim 1, wherein determining whether the data payload will be decoded is performed before forwarding any part of the packet.

7. A method according to claim 1, wherein not forwarding the entire payload of the packet if the data payload will not be decoded comprises not forwarding any of the packet.

8. A method according to claim 7, comprising forwarding a message in place of a plurality of packets not forwarded.

9. A method according to claim 1, wherein forwarding the payload of the packet comprises forwarding the packet along with a connection indication field.

10. A method according to claim 1, wherein forwarding the payload of the packet comprises forwarding through a tunnel used by a number of connections greater than the number of channels in the tunnel.

11. A method according to claim 1, wherein the first base station and the second base station comprise base transmission stations.

12. A method according to claim 1, wherein the first base station comprises a base station controller.

13. A method according to claim 1, wherein not forwarding the entire payload of the packet if the data payload will not be decoded comprises forwarding less than the entire payload of the packet.

14. A method according to claim 13, wherein forwarding less than the entire payload of the packet comprises forwarding only a header of the packet.

15. A method according to claim 1, wherein forwarding the data payload of the packet if the data payload will be decoded comprises forwarding the entire packet.

16. A method according to claim 1, wherein forwarding the data payload of the packet if the data payload will be decoded comprises forwarding the content of the payload of the packet.

17. A method of forwarding signals over a cellular link, comprising:
   receiving, at a first base station of a cellular fixed network, a packet of signals having a data payload directed to a second base station;
   determining whether the data payload will be used based on information retrieved from a signaling line corresponding to the link; and
   forwarding the data payload of the packet if the data payload will be used and not forwarding the entire data payload of the packet if the data payload will not be used.

18. A method according to claim 1, wherein determining whether the data payload will be used is performed after forwarding at least part of the packet.

19. A method according to claim 18, wherein not forwarding the entire payload of the packet if the data payload will not be used comprises forwarding less than the entire payload of the packet.

20. A method according to claim 19, wherein forwarding less than the entire payload of the packet comprises forwarding only a header of the packet.

21. A method according to claim 20, wherein forwarding the payload of the packet comprises forwarding through a tunnel used by a plurality of connections.

22. Apparatus for compressing packets being forwarded over a link between base stations, comprising:
   an input interface which receives packets having a data payload;
   a processor which determines whether the data payload carries meaningful information and will be decoded by a remote base station; and
   an output interface which forwards the payload of the packet if the data payload carries meaningful information and will be decoded by the remote station and does not forward the entire packet if the data payload does not carry meaningful information.

23. Apparatus according to claim 22, wherein the processor which determines whether the data payload carries meaningful information also generates the packets.

24. Apparatus according to claim 22, wherein the processor examines a header of the packets to determine whether the data payload is meaningful.

25. Apparatus according to claim 22, wherein the output interface begins to forward the packets before the processor determines whether the data payload is meaningful.

26. Apparatus according to claim 22, comprising a delay unit which delays forwarding the packets while the processor determines whether the payload is meaningful.

27. Apparatus for compressing packets being forwarded over a link between base stations, comprising:
   a first input interface for receiving packets having a data payload;
   a second input interface for receiving information from a signaling line corresponding to the link carrying the data payload;
   a processor which determines whether the data payload carries meaningful information, based on information received from the signaling line; and
   an output interface which forwards the payload of the packet if the data payload carries meaningful information and does not forward the entire packet if the data payload does not carry meaningful information.

* * * * *